United States Patent
Zelenov et al.

(10) Patent No.: US 11,513,828 B1
(45) Date of Patent: Nov. 29, 2022

(54) SYSTEM AND METHOD FOR RAPID CLONING OF VIRTUAL MACHINES UNDER LOAD BALANCING

(71) Applicant: Parallels International GmbH, Schaffhausen (CH)

(72) Inventors: Anton Zelenov, Moscow (RU); Nikolay Dobrovolskiy, Moscow (RU); Serguei M. Beloussov, Costa Del Sol (SG)

(73) Assignee: Parallels International GmbH, Schaffhausen (CH)

( * ) Notice: Subject to any disclaimer, the term of this patent is extended or adjusted under 35 U.S.C. 154(b) by 168 days.

(21) Appl. No.: 15/477,209

(22) Filed: Apr. 3, 2017

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/45562* (2013.01); *G06F 2009/45575* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 9,336,103 B1* | 5/2016 | Hasbe | ................. | G06F 11/2023 |
| 2005/0278566 A1* | 12/2005 | Jones | .................... | G06F 11/006 |
| | | | | 714/5.11 |
| 2008/0104608 A1* | 5/2008 | Hyser | ................... | G06F 9/5088 |
| | | | | 718/105 |
| 2012/0102135 A1* | 4/2012 | Srinivasan | .......... | G06F 11/1438 |
| | | | | 709/213 |
| 2012/0324449 A1* | 12/2012 | Huetter | ................. | G06F 9/5066 |
| | | | | 718/1 |
| 2014/0325170 A1* | 10/2014 | Aswathanarayana | ........................ |
| | | | | G06F 9/45558 |
| | | | | 711/162 |
| 2014/0337836 A1* | 11/2014 | Ismael | .................... | G06F 9/455 |
| | | | | 718/1 |
| 2015/0106810 A1* | 4/2015 | Ciano | ................. | G06F 9/45533 |
| | | | | 718/1 |
| 2015/0178109 A1* | 6/2015 | Li | ........................ | G06F 9/45558 |
| | | | | 718/1 |
| 2015/0339144 A1* | 11/2015 | Cao | ..................... | G06F 9/45558 |
| | | | | 718/1 |
| 2016/0100330 A1* | 4/2016 | Broustis | ................ | H04W 24/02 |
| | | | | 370/237 |

(Continued)

*Primary Examiner* — Wynuel S Aquino
(74) *Attorney, Agent, or Firm* — Rosenberg, Klein & Lee (57) ABSTRACT

A system and method is provided for managing virtualized computing resources. An exemplary method includes executing a computing service comprised of virtualized computing resources including a first virtual machine and a network address mapping module. The method further includes, responsive to receiving an indication that additional virtualized computing resources are needed to handle one or more requests from a client and directed to the computing service, generating a second virtual machine that can handle requests for the computing service by performing a linked cloning operation of the first virtual machine. The method includes, configuring the network address mapping module to modify requests for the second virtual machine, such that the second virtual machine has the same network address as the first virtual machine.

6 Claims, 4 Drawing Sheets

(56) References Cited

U.S. PATENT DOCUMENTS

| | | | | |
|---|---|---|---|---|
| 2016/0162315 | A1* | 6/2016 | Pannem | G06F 9/45558 |
| | | | | 718/1 |
| 2016/0210166 | A1* | 7/2016 | Cucinotta | G06F 9/45558 |
| 2016/0335111 | A1* | 11/2016 | Bruun | G06F 9/45558 |
| 2017/0041379 | A1* | 2/2017 | Zhu | H04L 12/4641 |
| 2017/0083354 | A1* | 3/2017 | Thomas | H04L 67/24 |
| 2018/0217859 | A1* | 8/2018 | Triplett | G06F 9/45558 |
| 2018/0234308 | A1* | 8/2018 | Bruun | H04L 41/5054 |
| 2018/0276023 | A1* | 9/2018 | Matsueda | G06F 9/45558 |

\* cited by examiner

SYSTEM AND METHOD FOR RAPID CLONING OF VIRTUAL MACHINES UNDER LOAD BALANCING

TECHNICAL FIELD

The present disclosure relates generally to managing computing system resources, and, more particularly, to a system and method for rapid cloning of virtual machines under load balancing.

BACKGROUND

With virtual machine technology, a user can create and run multiple operating environments on a server at the same time. Each operating environment, or virtual machine, requires its own operating system (OS) and can run software applications independently from the other virtual machines. Virtual machine technology provides many benefits as it can lower information technology (IT) costs through increased efficiency, flexibility and responsiveness. Each virtual machine acts as a separate environment that reduces risks and allows developers to quickly recreate different OS configurations or compare versions of applications designed for different OSs. Additional customer uses for VMs include cloud services, targeted production server consolidation, hosting of legacy applications (older versions), and computer or server backup.

However, the task of management and administration of a large set of services and servers for many users has become complex, a problem known especially to administrators of cloud services and large data centers. Each routine operation often requires expensive manual operations, and, when handling thousands of users even on single hardware box with a single operating system, each simple operation, which should be performed hundreds and thousands of times, becomes very expensive. For example, a cloud computing service can utilize many load-balanced nodes to provide shared computing resources, including computer processing, storage, network, and other applications, to computers and other devices in an on-demand manner. Such cloud computing services can require many administrative operations applied across a large set of nodes supporting the cloud computing service. Accordingly, there is a need in the art for an effective way to manage and administrate systems executing virtualized computing resources of a computing service.

SUMMARY

Thus, a system and method is disclosed herein for managing virtualized computing resources of a computing service, and, more particularly, for rapid cloning of virtual machines under load balancing.

According to an exemplary aspect, a method is provided for managing computer resources. In this aspect, the method includes executing a computing service comprised of a plurality of virtualized computing resources including a first virtual machine and a network address mapping module. The method further includes, responsive to receiving an indication that additional virtualized computing resources are needed to handle one or more requests directed to the computing service, generating a second virtual machine configured to handle requests for the computing service by performing a linked cloning operation on the first virtual machine; and configuring the network address mapping module to modify the requests for the second virtual machine, wherein the second virtual machine has a same network address as the first virtual machine.

According to another exemplary aspect, the performing a linked cloning operation on the first virtual machine may comprise pausing execution of the first virtual machine; copying state data of the first virtual machine to state data of the second virtual machine; modifying a copy-on-write setting associated for guest memory of the first virtual machine; and creating a linked virtual disk for state data of the second virtual machine; and resuming execution of the first virtual machine and the second virtual machine.

According to another exemplary aspect, network settings within the second virtual machine have been copied from network settings within the first virtual machine.

According to another exemplary aspect, the second virtual machine is configured to handle the requests for the computing service without restarting services executing on the second virtual machine.

According to another exemplary aspect, the indication that additional virtualized computing resources are needed to handle the one or more requests directed to the computing service is determined based on at least one of: an average response time of the computing service, a count of failed requests due to timeout, and CPU resources consumed by the computing service.

According to another exemplary aspect, the indication that additional virtualized computing resources are needed to handle the one or more requests directed to the computing service is received from a load balancer associated with the computing service.

According to another exemplary aspect, the network addressing mapping module is configured to perform network address translation (NAT) between network addresses of the first and second virtual machines and a load balancer associated with the computing service.

According to another exemplary aspect, the method further comprises, responsive to receiving an indication that less virtualized computing resources are needed to handle the one or more requests directed to the computing service, destroying one or more virtual machines associated with the computing service.

In one further exemplary aspect, a system is provided for managing virtualized computing resources. In this aspect, the system includes a plurality of virtualized computing resources including a first virtual machine; a network address mapping module configured to modify incoming requests for the first virtual machine; a load balancer module configured to: forward at least one request directed to a computing service to at least one of the plurality of virtualized computing resources; and determine that additional virtualized computing resources are needed to handle the at least one request directed to the computing service. The system further includes a virtual machine manager configured to: responsive to receiving an indication from the load balancer module that the additional virtualized computing resources are needed, generate a second virtual machine configured to handle the at least one request for the computing service by performing a linked cloning operation on the first virtual machine to generate the second virtual machine; configure the network address mapping module to modify the at least one request for the second virtual machine; and update the load balancer module to include the second virtual machine for subsequent, forwarded requests.

According to another exemplary aspect, a computer-readable medium is provided comprising instructions that comprises computer executable instructions for performing any of the methods disclosed herein.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF DRAWINGS

The accompanying drawings, which are incorporated into and constitute a part of this specification, illustrate one or more example aspects of the invention and, together with the detailed description, serve to explain their principles and implementations.

DETAILED DESCRIPTION

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

As described above, a cloud computing service may use many load-balanced nodes (e.g., executing as virtual machines) to provide shared computing resources to clients on-demand. The term load balancing refers to dividing the amount of work that the service must undertake between two or more servers (or virtual machines) of a similar kind, such that more work is accomplished, and consequently, clients of the cloud service will be served more efficiently. Under one conventional technique, to add a node to a load-balanced system, a system administrator must wait for a new virtual machine to be created from a template, then wait for the new virtual machine to finish starting up before attaching the new virtual machine to the load balancer. In another known technique, a system administrator could clone an existing, running virtual machine to add a node to the cloud computing service. However, this technique incurs significant delays because all applications and services running inside the new virtual machine would have to be restarted to allow the applications and services to continue working properly in case the cloned virtual machine was assigned a new network address (e.g., Internet Protocol address) after the virtual machine was cloned.

According to an exemplary aspect, the disclosed system and method is provided to rapidly clone virtual machines to dynamically increase the virtualized computing resources of a load-balanced system based on incoming requests to the system. As will be described in detail below, the system and method are configured to detect when the system needs more computational resources to handle requests incoming to a load balancer. In this instance, the load balancer can signal a virtual machine manager module, which in turn executes a live, linked cloning operation of one of the virtual machines designated as a worker node in the system. To prevent a long process of network discovery and assignment of a new Internet Protocol (IP) address, the system and method implements a network address mapping module, such as a network address translation (NAT) service, that enables the newly cloned virtual machine to have a new network address form the perspective of the load balancer while still maintaining its same internal IP address. As a result, the system and method of the present disclosure can quickly clone virtual machines and quickly initiate their functionality within the load balanced system.

While the present disclosure describe an exemplary aspect executing virtual machines (VMs), it is understood that other exemplary aspects may utilize any virtual execution environment (VEE), which are environments that support program code execution, where at least a part of the "real" hardware and software required for running program code are presented as their virtual analogs. The VEE can be implemented using a variety of suitable virtualization technologies. For example, the VEE can be any of a virtual private server, a virtual machine, a software container using operating-system-level virtualization, a hypervisor-based virtual machine, a lightweight hypervisor-based virtual machine, a hypervisor-based VM with hardware virtualization support, a hypervisor-based VM without hardware virtualization support, a hypervisor-based VM with or without security support (e.g., using Intel LaGrande® technology, a session of Terminal Server Windows®, a session of Citrix Presentation Server®, and so forth.

Figure 1:
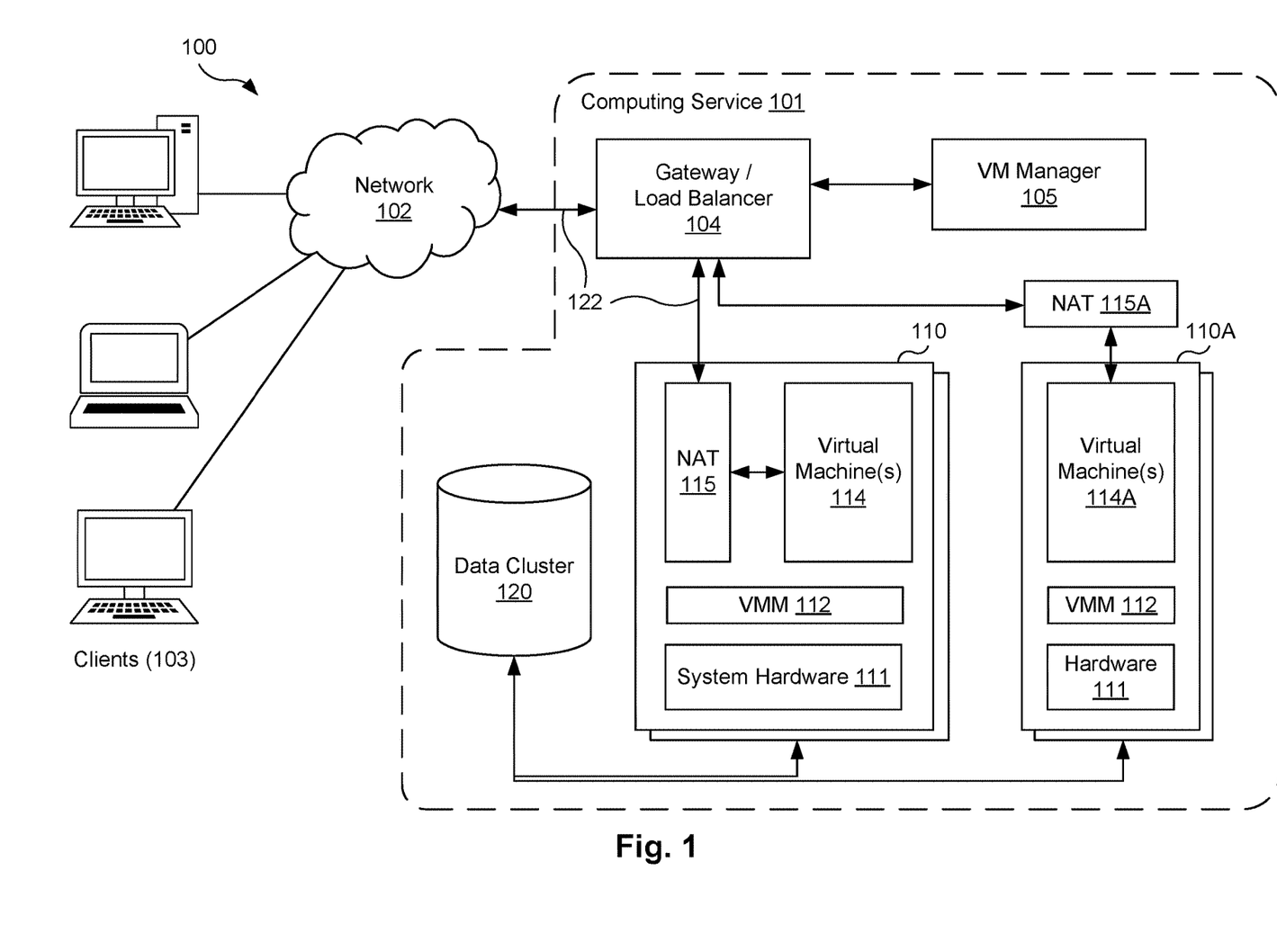
FIG. 1 illustrates a block diagram of a system for managing virtualized computing resources of a computing service according to an exemplary aspect.

FIG. 1 illustrates a block diagram of a system 100 for managing virtualized computing resources according to an exemplary aspect. As shown, the system generally includes a computing service 101 that is accessible to one or more clients 103 via a network 102. The computing service 101 may be configured to receive one or more requests from a plurality of end users, depicted as clients 103, process the requests, and return an appropriate response (if needed) to the end users.

For example, the computing service 101 may include an application executing on a cloud service, such as a Platform-as-a-Service (PaaS), which is managed by a cloud service provider and provides a platform to an enterprise or user for running certain applications. In another example, the computing service 101 can include a specialized application provided as a cloud service, such as a Software-as-a-Service (SaaS), which is managed by a service provider to provide a complete application executing on a virtualized platform for performing certain tasks. While exemplary aspects are herein discussed using a cloud service, it should be understood that the computing service 101 can be other types of client-server applications executing on a virtualized platform, such as a multi-tier web application running in a virtualized platform within a private data center.

In one exemplary aspect, the computing service 101 includes a gateway node 104, a virtual machine (VM) manager 105, one or more physical servers 110, and one or more storage devices 120. As described in greater detail below, the gateway node 104 and VM manager 105 may coordinate to dynamically allocate additional virtualized computing resources on the physical servers 110 based on the incoming flow of requests and on current workloads on the existing virtualized computing resources.

In general, one or more virtual machines 114 can be created on the physical servers 110 which include system hardware 111 and a virtual machine monitor 112 (also known as a hypervisor). The physical servers 110 may be a server computer, desktop, or any other electronic device sufficient for implementation virtualization as described herein. For example, the system hardware 111 of a physical server typically includes a computer processing unit, memory (e.g., random access memory), and a local hard disk. The physical server 110 will normally include additional devices, software modules, and the like, as would be appreciated to one skilled in the art, but are not shown herein so as to not unnecessarily obscure the aspects of the disclosure. As software, the code for the VM 114 will typically execute on the actual system hardware 111. The virtual machine monitor 112 (hereinafter referred to as "VMM 112") is configured to control and manage virtualization on the system hardware 111. The VMM 112 may run directly on the underlying system hardware 111 or as an application or component running within a host operating system installed on the system hardware 111.

In one exemplary aspect, the virtual machines 114 may be worker nodes executing one or more guest applications, services, or daemons configured to handle or facilitate the handling of requests to the computing service 101. In some aspects, a plurality of virtual machines 114 may be configured as separate components or nodes which coordinate to handle requests to the computing service. For example, the virtual machines 114 may be configured with different installed software packages (e.g., Apache® web server, redis® cache), settings, and configurations to act as separate layers of a multi-tier application, such as an application server and cache tiers.

In one exemplary aspect, the computing service 101 includes a data cluster 120 configured to store data from virtual machines 114 for services such as databases, storage area networks (SAN), messaging queues, etc. The data cluster 120 enables data persistence and data sources for the computing service 101 to live outside of the virtual machines 114.

In one exemplary aspect, the gateway node 104 acts as a public-facing node of computing service 101 and is accessible to outside clients (e.g., clients 103). The gateway node 104 is configured to receive and forward incoming traffic (depicted by arrows 122) from clients 103 to the appropriate node within computing service 101. Similarly, the gateway node 104 may return responses (if any) from the nodes within computing service 101 back to the originating clients 103. The gateway node 104 (also referred to herein as a load balancer 104) may be configured to perform load balancing by distributing incoming requests among various worker nodes with the computing service 101. While present disclosure describes an exemplary aspect having a single gateway node 104, it should be understood that the gateway node 104 may represent multiple load balancers, or a distributed load balancer, configured to perform the techniques described herein.

In one exemplary aspect, the load balancer 104 may be configured to calculate an amount of resources needed to handle requests received by the load balancer and determine whether the existing virtualized computing resources are sufficient. If additional resources are needed, the load balancer 104 may direct the VM manager 105 to create one or more additional VMs 114, for example. Conversely, if the load balancer 104 determines less computational resources are needed than are currently being provided, the load balancer 104 may direct the VM manager 105 to remove or destroy VMs. As described in greater detail below, the VM manager 105 may quickly produce additional worker nodes by creating a linked clone of an existing, running VM. A linked clone is a copy of a VM that shares virtual disks with the base VM in an ongoing manner and requires access to the base VM in order to function. It is noted that because a VM 114 uses a separate data storage (e.g., data cluster 120) for persistence and maintaining state, the persistent data of the VM 114 is not cloned and duplicated. Furthermore, internal caches of a virtual machine may live separately from this time. After creating the linked clone, the load balancer 104 may then send requests to the new VM.

According to one exemplary aspect, the clone VM may have the same settings and configurations of the original VM, including having the same IP address and all network state. Rather than initiate a typical process of network discovery, receiving a newly assigned IP address, and restarting internal services to adopt the new IP address, which introduces significant delays and administrative cost, the IP address of the clone VM remains the same as the original VM. To prevent issues from having the same IP addresses in a network, the VM manager 105 starts a network address translation (NAT) service for the new virtual machine, as described below.

In one exemplary aspect, the computing service 101 may include one or more network address mapping modules 115 configured to provide network address translation services for IP traffic flowing to and from the VMs 114. The network address mapping module 115 (also referred to herein as "NAT 115") changes the source and destination addresses of network traffic to map a "publicly" known IP address of a VM to a different IP address within a "private" IP address space. In contrast to common NAT services (which hides an IP address space consisting of private IP addresses like 192.168.0.x behind a single IP address in the public IPv4 address space), the network addressing mapping module 115 is configured to map separate public IP addresses of a VM 114 and its clones to a same private IP address known amongst the VM and its clones. In this aspect, the public IP address of a VM refers to the IP address known to internal components of the computing service 101, which may not necessarily be accessible or known to clients 103 outside of the computing service 101. As such, the network address mapping module 115 enables a group of clone VMs 114 to receive traffic at separate IP addresses while internally sharing a single, private IP address.

In some exemplary aspects, the NAT 115 may be a software module executing within a host or physical server 110, e.g., an application executed by the host operating system of the physical server 110, or executing as a virtual machine itself. In other exemplary aspects, the NAT 115 may be a dedicated hardware module communicatively coupled to one or more hosts. In one exemplary aspect, each physical server 110 may have one NAT 115 executing thereon and configured to manage all incoming to and outgoing traffic from one or more VMs 114 executing on that host (i.e., one NAT per host). In other exemplary aspects, the network address mapping module may be an external service (depicted in FIG. 1 as NAT 115A) executing outside of a host 110A and responsible for traffic of one or more associated VMs 114A on the host 110A. The external NAT 115A may be linked to a VM 114A to allow for VM migration to another physical server (e.g., host 110) with set network address translation.

It is understood that while exemplary aspects of the present disclosure depict the load balancer 104 and VM manager 105 as separate components, other exemplary aspects may include the functionality of the load balancer 104 and VM manager 105 in a combined component. Furthermore, while exemplary aspects describe specific logic and decision-making performed separately by the load balancer 104 and VM manager 105, other exemplary aspects can be varied to shift and/or re-order logic and decision making to perform the described techniques. For example, the load balancer 104 may be configured to provide raw data regarding the state of incoming requests to the VM manager 105, which in turn determines whether additional resources are needed and creates VMs accordingly. In another example, the load balancer 104 may be configured to monitor both the incoming traffic and the state of the VMs to make a determination for more resources, and then provide a simple "create" instruction to the VM manager 105.

In general, the term "module" as used herein can refer to a software service or application executed as part of the computing service 101. However, in general, the term module can be considered to be executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

Moreover, in general, it should be appreciated that the disclosed system and method is described herein in the context of a hosted virtualized computing system. However, in alternative aspects, the system and method may be implemented for a non-hosted virtualized computer system, and may also be implemented directly in a computer's primary OS, both where the OS is designed to support virtual machines and where the OS does not support virtual machines.

Figure 2:
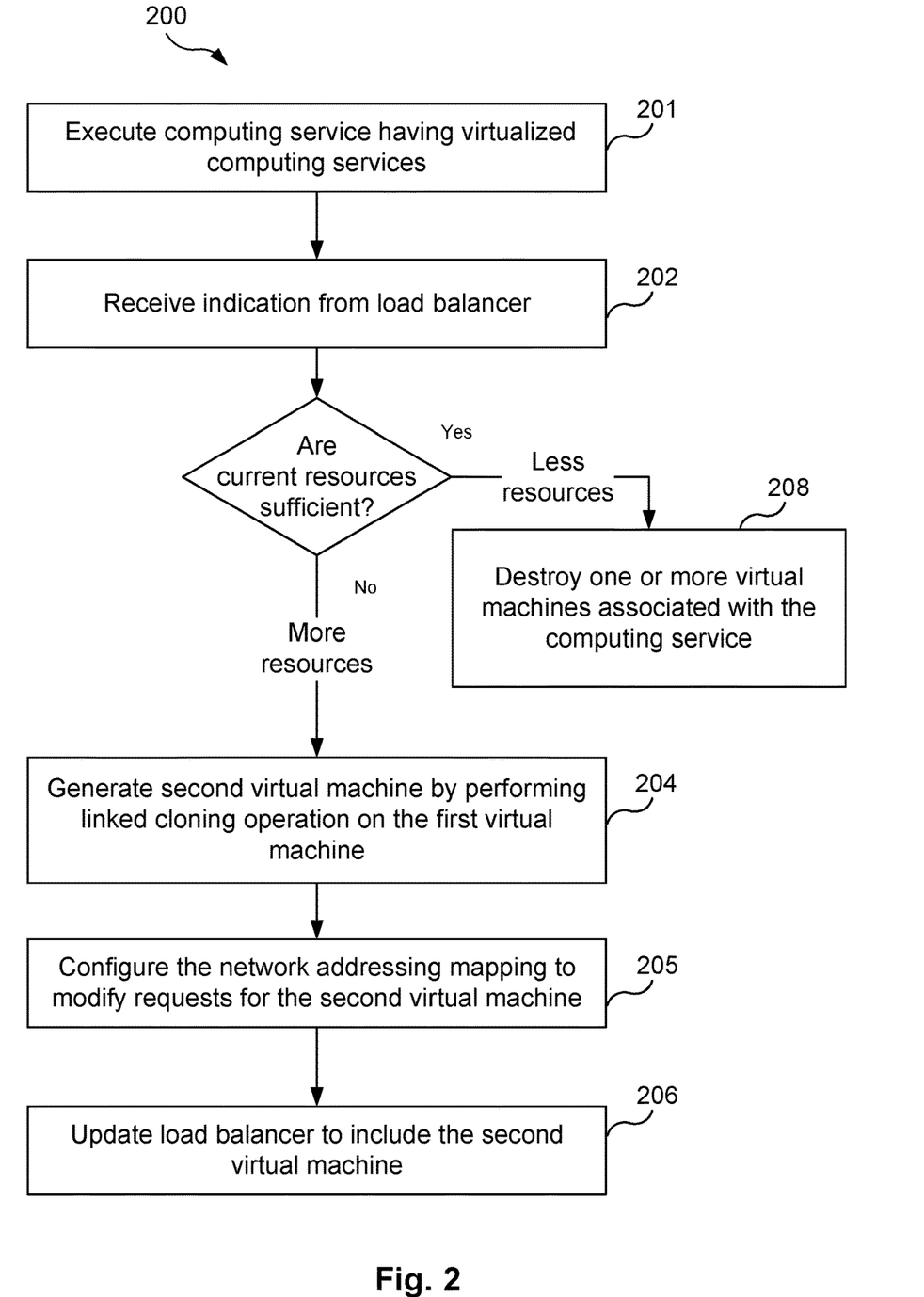
FIG. 2 illustrates a flowchart of a method for managing virtualized computing resources of a computing service according to an exemplary aspects.

FIG. 2 illustrates a flowchart of a method 200 for managing virtualized computing resources of a computing service according to an exemplary aspects. It is noted that the following description of the exemplary method makes reference to the system and components described above. Furthermore, for illustration purposes, the method 200 may be described in conjunction with FIGS. 3A and 3B, which are block diagrams illustrating operations for allocating and deallocating virtualized computing resources according to an exemplary aspect.

Figure 3A:
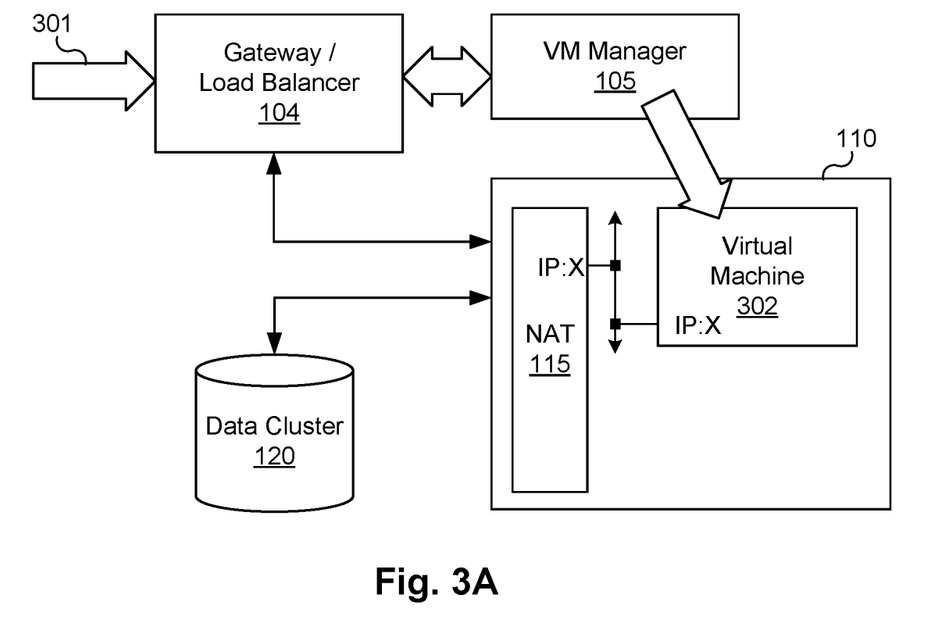
FIGS. 3A and 3B are block diagrams illustrating operations for allocating and deallocating virtualized computing resources according to an exemplary aspect.

As shown, initially at step 201, the VM manager 105 executes a computing service 101 comprised of a plurality of virtualized computing resources, which includes a first virtual machine and a network address mapping module 115. For example, as shown in FIG. 3A, the computing service 101 includes at least one VM 302 configured to handle requests from clients (represented by the arrow 301).

According to the exemplary aspect, at step 202, the VM manager 105 receives (e.g., from the load balancer 104) an indication relating to whether the current virtualized computing resources are sufficient to handle one or more requests directed to the computing service 101. The load balancer 104 may determine whether the current virtualized computing resources are sufficient for handling incoming requests based on metrics related to the incoming requests and to the current virtualized computing resources. For example, the load balancer 104 may maintain a target threshold for resource consumption (e.g., 75% or less of CPU load) and determine that an increasing amount of incoming requests may cause the resource consumption to exceed the target threshold. In this case, the load balancer 104 would determine that the current virtualized computing resources are insufficient to handle the additional requests.

In some exemplary aspects, the load balancer 104 may calculate or obtain from other components (e.g., VM manager 105, VMs 114, VMMs 112) one or more metrics related to the incoming requests and to the virtualized computing resources which indicate a current state of the computing service 101. For example, such metrics may include the memory resources consumed by the computing service (e.g., individual and aggregate RAM usage of the VMs 114), the CPU resources consumed by the computing service (e.g., individual and aggregate CPU load of VMs 114), a number of open user sessions executing on the virtualized computing resources, average response rate of the VMs, and a count of failed requests by time out. In some exemplary aspects, the load balancer 104 may calculate or obtain historical metrics that indicate certain pattern or trends relating to the performance of the computing service 101, such as statistics relating to incoming requests or the system load as a function of the time of day or day of the week, so as to prepare for an incoming workload. For example, on a Monday morning, the load balancer 104 may determine that the current resources are insufficient to handle an anticipated usage of system resources based on the historical statistics indicating usage at daytime hours of a weekday that exceed the defined threshold.

In some exemplary aspects, the indication received by the VM manager 105 may be an alert or status of insufficient resources as determined by another component, such as the load balancer 104. In other exemplary aspects, the received indication may be represented by an explicit request (e.g., from the load balancer 104) to create additional virtual machines due to insufficient resources. In some exemplary aspects, the received indication may comprise a stream of data from the load balancer 104 relating to incoming requests, such as a rate of requests per second, which the VM manager 105 may itself use to determine whether the current virtualized computing resources are sufficient.

According to the exemplary aspect, at step 204, responsive to receiving an indication that additional virtualized computing resources are needed to handle requests directed to the computing service 101, the VM manager 105 generates a second virtual machine (i.e., "clone VM") by performing a linked cloning operation on the first virtual machine (i.e., "base VM", or "original VM"). As described herein, a clone is a copy of an existing virtual machine. A clone has the same configuration as the original, the same guest OS, and the same installed applications and data, including even the IP address and MAC address of the VM's virtual network adapter.

Figure 3B:
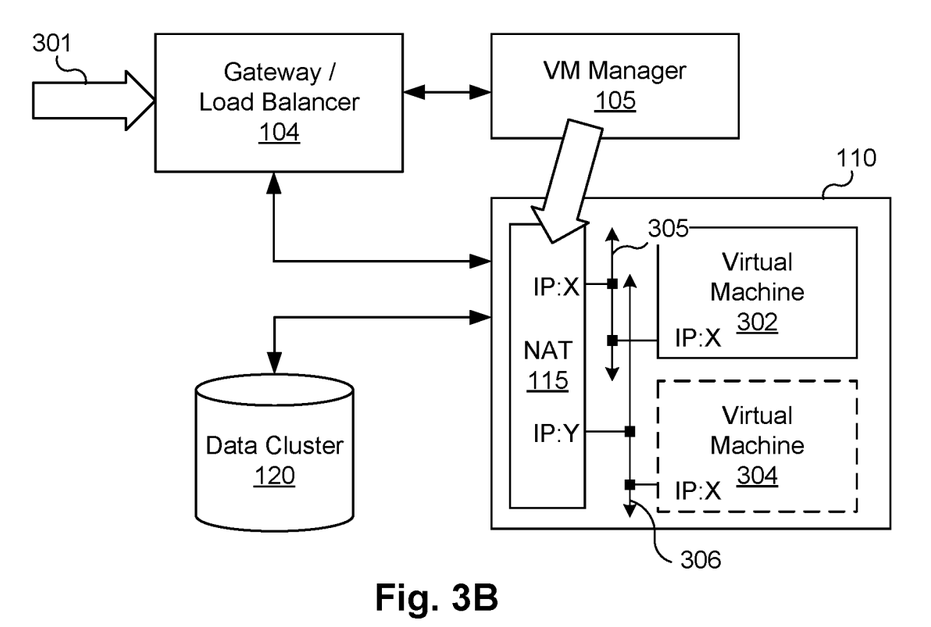

As shown in FIG. 3B, VM manager 105 performs a live, linked cloning operation on the still-running base VM 302 to create one or more second "cloned" VMs 304. In some exemplary aspects, the VM manager 105 may execute a live, linked cloning operation by first pausing (but not shutting down) execution of the base VM 302, and copying state data of the VM 302 to the clone VM 304. The VM manager may then modify a copy-on-write setting associated for guest memory of the base VM 302, and create a linked, virtual disk (i.e., linked, rather than a scratch or full-copy virtual disk) for state data of the clone VM 304. The VM manager 105 may then resume execution of the base VM 302 and the clone VM 304. As used herein, a "live" cloning operation refers to a cloning operation that is performed on a virtual machine without having to power off the virtual machine (in some cases, performed with only a brief pause or timeout), thereby speeding up the operations of the computing service. In another exemplary aspect, the VM manager 105 may execute a cloning operation by creating a snapshot in the base VM, generating a linked clone using the snapshot, and then running that linked clone.

According to one exemplary aspect, as a clone of the first virtual machine 302, the second virtual machine 304 includes the same or substantially similar settings, configurations, and software packages of the first virtual machine, and thus is configured to handle requests for the computing service 101 similar to the first virtual machine. Similarly, network settings within the second virtual machine have been copied from network settings within the first virtual machine. That is, as a clone of the first virtual machine, the second virtual machine has a same network address as the first virtual machine. For example, as shown in FIG. 3B, the clone VM 304 maintains the same IP address ("IP:X") as the base VM 302. As such, the clone VM 304 is configured to handle requests for the computing service without restarting services executing on the clone VM 304, as would be the case if the clone VM had to acquire a new IP address.

As described earlier, the VM 302 is configured to use an outside data cluster 120 for storing data of the persistence layer (i.e., persistent data), data records, and other data relating to the state of the computing service 101. As such, the described method avoids duplicating persistent data in the clone VM 304 and causing possible inconsistent states in the computing service 101. In some exemplary aspects, the internal caches of the VMs 302 and 304 may live separately from this time forward. For example, the VM 302 may be executing a web server application with its own cache where the VM puts recently generated web pages to speed up content delivery for subsequent, similar requests. After the cloning process, the VM 302 and VM 304 each have their own respective caches, and the caches' contents can subsequently diverge because the requests may differ for the separate VMs 302 and 304.

At step 205, the VM manager 105 configures the network addressing mapping module 115 to modify requests for the second virtual machine. The network addressing mapping module is configured to perform network address translation (NAT) between network addresses of the first and second virtual machines and a load balancer associated with the computing service. That is, the network addressing mapping module 115 may be configured to change the destination address of incoming requests for the second virtual machine to the cloned IP address, and change the source address of outgoing responses from the second virtual machine to the new public-facing address. For example, as shown in FIG. 3B, the VM manager 105 configures the NAT 115 to map the private IP address ("IP:X") and relevant ports communicating with the clone VM 304 to a new, public IP address (e.g., "IP:Y"). As such, during operations, the NAT 115 is configured to alter the destination address of incoming requests for the clone VM 304 with the (cloned) IP address "IP:X", and change the source address of outgoing responses from the clone VM 304 with the new public facing IP address "IP:Y."

In some exemplary aspects, the VM manager 105 may instantiate a new instance of a network addressing mapping module 115 that is shared by at least the first and second virtual machines. In another exemplary aspect, the VM manager 105 may re-configure an existing instance of a network addressing mapping module 115 used by the first virtual machine to include the second virtual machine.

In some exemplary aspects, the NAT 115 establishes a new virtual network 306 to link to the clone VM 304, which is separate from a virtual network 305 linking the NAT 115 to the original VM 302. In one exemplary aspect, the virtual networks 305 and 306 are independent and contain only the NAT service and the VM 302 and 304, respectively, thereby enabling network communications between the VMs 302, 304 and the NAT 115 despite having the same cloned network addresses.

Referring back to FIG. 2, at step 206, responsive to completing the changes to NAT 115, the VM manager 105 may update the load balancer 104 to include the second virtual machine. In some exemplary aspects, the VM manager 105 may provide the load balancer 104 with the public-facing network address of the second virtual machine (e.g., "IP:Y" in the case of clone VM 304 in FIG. 3B). In some exemplary aspects, the VM manager 105 notifies the load balancer 104 that the second VM is available as act as one of the plurality of worker nodes for the computing service 101, while in other exemplary aspects, the second VM may be configured to self-advertise its availability to the load balancer 104 according to settings cloned from the original VM 302. Accordingly, the load balancer 104 may now forward requests 301 to NAT 115, which then directs traffic to either the original VM 302 or the clone VM 304.

According to an exemplary aspect, referring back to FIG. 2, at step 208, responsive to receiving an indication that less virtualized computing resources are needed to handle the plurality of requests directed to the computing service 101, the VM manager 105 may destroy one or more virtual machines associated with the computing service at step 207. In some exemplary aspects, the VM manager 105 configures the NAT instance corresponding to the destroyed VM to de-instantiate any virtual networks linking the NAT with the now-destroyed VM. In some aspects, the VM manager 105 may pro-actively notify the load balancer 104 that the destroyed VMs are no longer available to the computing service 101, such that the load balancer 104 will no longer forward requests to the VMs that are now destroyed. In other aspects, the load balancer 104 may discover one or more VMs are no longer available a result of a status or heartbeat functionality performed by the load balancer on its worker nodes. In some exemplary aspects, the VM manager 105 may select any VMs that are clones (e.g., as created during step 204) for removal prior to selecting other VMs for removal. In some exemplary aspects, the VM manager 105 may shut down execution of one or more VMs, thereby yielding some resources of the system hardware 111 back to the physical server 110. Advantageously, the VM manager 105 is able to continuously evaluate the computing resources requirements and manage the number of VMs need to efficiently manage execution of the requests without providing an unnecessary burden on the system hardware of the physical server 110.

Figure 4:
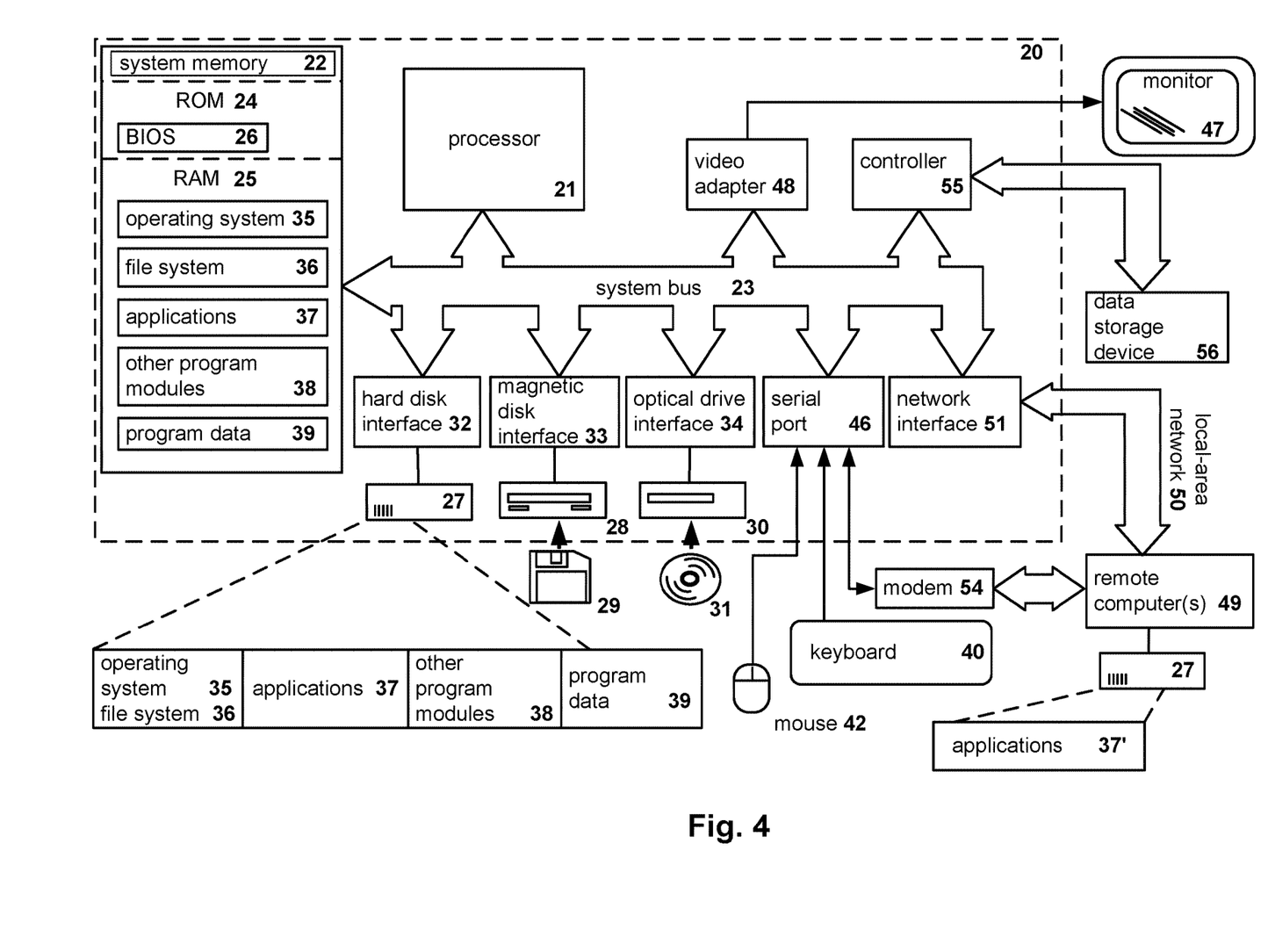
FIG. 4 illustrates a block diagram of an example of a general-purpose computer system on which the disclosed system and method can be implemented according to an exemplary aspect.

FIG. 4 illustrates a block diagram of an example of a general-purpose computer system (which can be a server) on which the disclosed system and method can be implemented according to an example aspect. As shown, a general purpose computing device is provided in the form of a computer system 20 or the like including a processing unit 21, a system memory 22, and a system bus 23 that couples various system components including the system memory to the processing unit 21. It should be appreciated that computer system 20 can correspond to the host device described above, for example.

Moreover, the system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk (e.g., hard disk 136), a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20. The logical connections include a network interface 51 and connected to a local area network (i.e., LAN) 51, for example, and/or a wide area network (not shown). Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for managing computing resources, the method comprising:
   providing a computing service comprising a load balancer, one or more physical servers and one or more storage devices which provides virtualized computing resources to one or more client devices which are connected to the computing service via a network where the virtualized computing resources comprising virtual machines (VMs);
   determining by the computing service that a variation in the virtualized computing resources is required to handle client requests directed to the computing server by the one or more client devices; and
   upon determining that the variation is for an increase in the virtualized computing resources a virtual machine (VM) manager of the computing service executes a first process, wherein
   the determination by the computing service that the variation in the virtualized computing resources is required is performed by the load balancer;
   the load balancer makes the determination in dependence upon an incoming flow of client requests and current workloads of the existing virtualized computing resources;
   the first process executed by the VM manager comprises generating a linked clone VM of an existing VM; and
   the linked clone VM has:
      the same configuration as the existing VM;
      a guest operating system (OS) the same as the guest OS of the existing VM;
      a common set of installed applications and data as the existing VM;
      a common private Internet Protocol (IP) address with the existing VM;
      a different public IP address to the public address of the existing VM; and
      a common media access control (MAC) address of a virtual network adapter of the linked clone VM as the MAC address of another virtual media network adapter of the existing VM.

2. The method according to claim 1, wherein
   the computing service further comprises a network address mapping module (NAT); and
   the NAT is configured to map the common private IP address to both the different public IP address of the linked clone VM and the public IP address of the existing VM such that the linked clone VM and existing VM receive traffic at their respective public IP addresses whilst internally sharing a single private IP address.

3. A method for managing computing resources, the method comprising:
   providing a computing service comprising a load balancer, one or more physical servers and one or more storage devices which provides virtualized computing resources to one or more client devices which are connected to the computing service via a network where the virtualized computing resources comprising virtual machines (VMs);
   determining by the computing service that a variation in the virtualized computing resources is required to handle client requests directed to the computing server by the one or more client devices; and
   upon determining that the variation is for an increase in the virtualized computing resources a virtual machine (VM) manager of the computing service executes a first process; wherein
   the determination by the computing service that the variation in the virtualized computing resources is required is performed by the load balancer or the VM manager in dependence upon at least one of an incoming flow of client requests, current workloads of the existing virtualized computing resources, and a rate of incoming client requests; and
   the first process comprises:
      establishing a clone VM;
      pausing with the VM manager an existing VM;
      copying state data of the existing VM to the clone VM;
      modifying a copy-on write setting associated with a guest memory of the existing VM;
      creating a linked virtual disk for the state data of the cloned VM;
      resuming execution of the existing VM; and
      executing the cloned VM as a linked clone VM of the existing VM.

4. The method according to claim 3, wherein the first process further comprises:
   establishing a different public Internet Protocol (IP) address for the linked clone VM to the public IP address of the existing VM; and
   establishing a private IP address for the linked clone VM as an existing private IP address for the existing VM.

5. A method for managing computing resources, the method comprising:
   providing a computing service comprising a load balancer, one or more physical servers and one or more storage devices which provides virtualized computing resources to one or more client devices which are connected to the computing service via a network where the virtualized computing resources comprising virtual machines (VMs);
   determining by the computing service that a variation in the virtualized computing resources is required to handle client requests directed to the computing server by the one or more client devices; and
   upon determining that the variation is for an increase in the virtualized computing resources a virtual machine (VM) manager of the computing service executes a first process; wherein
   the determination by the computing service that the variation in the virtualized computing resources is required is performed by the load balancer or the VM manager in dependence upon at least one of an incoming flow of client requests, current workloads of the existing virtualized computing resources, and a rate of incoming client requests; and
   the first process comprises:
      generating a snapshot of an existing VM in execution;
      generating a linked clone VM using the snapshot;
      executing the linked clone VM;
      establishing a different public Internet Protocol (IP) address for the linked clone VM to the public IP address of the existing VM;
      establishing a private IP address for the linked clone VM as an existing private IP address for the existing VM; and
      one of:

updating a network address mapping module of the computing service to map the now common private IP address of the linked clone VM and the existing VM to both the different public IP address of the linked clone VM and the public IP address of the existing VM such that the linked clone VM and existing VM receive traffic at their respective public IP addresses whilst internally sharing a single private IP address, and establishing a new instance of a network address mapping module of the computing service to map the now common private IP address of the linked clone VM and the existing VM to both the different public IP address of the linked clone VM and the public IP address of the existing VM such that the linked clone VM and existing VM receive traffic at their respective public IP addresses whilst internally sharing a single private IP address.

6. A method for managing computing resources, the method comprising:

providing a computing service comprising a load balancer, one or more physical servers and one or more storage devices which provides virtualized computing resources to one or more client devices which are connected to the computing service via a network where the virtualized computing resources comprising virtual machines (VMs);

determining by the computing service that a variation in the virtualized computing resources is required to handle client requests directed to the computing server by the one or more client devices; and upon determining that the variation is for an increase in the virtualized computing resources a virtual machine (VM) manager of the computing service executes a first process; wherein the determination by the computing service that the variation in the virtualized computing resources is required is performed by the load balancer or the VM manager in dependence upon at least one of an incoming flow of client requests, current workloads of the existing virtualized computing resources, and a rate of incoming client requests; and the first process comprises:

generating a snapshot of an existing VM in execution;

generating a linked clone VM using the snapshot;

executing the linked clone VM;

establishing a different public Internet Protocol (IP) address for the linked clone VM to the public IP address of the existing VM;

establishing a private IP address for the linked clone VM as an existing private IP address for the existing VM; and updating a network address mapping module of the computing service to map the now common private IP address of the linked clone VM and the existing VM to both the different public IP address of the linked clone VM and the public IP address of the existing VM such that the linked clone VM and existing VM receive traffic at their respective public IP addresses whilst internally sharing a single private IP address; and one of:

the first process further comprises notifying the load balancer with the VM manager that the linked clone VM is now a newly available virtualized computing resource, and the linked clone VM once established self-advertises to the load balancer that it is now a newly available virtualized computing resource.

* * * * *